Patented July 10, 1951

2,559,855

UNITED STATES PATENT OFFICE 2,559,855

POLYMERIZATION WITH ORGANIC TERTIARY AMINE CATALYSTS

Joseph B. Dickey and Harry W. Coover, Jr., Rochester, N. Y., assignors to Eastman Kodak Company, Rochester, N. Y., a corporation of New Jersey No Drawing. Application May 21, 1949, Serial No. 94,743

7 Claims. (Cl. 260—89.7)

This invention relates to a process for the catalytic polymerization of unsaturated organic compounds, wherein tertiary amines are the polymerization catalysts.

The polymerization of vinyl compounds and other unsaturated organic compounds by a free-radical mechanism or by a cationic chain mechanism induced by acid catalyst is well known. The polymerization of methyl acrylate, vinyl chloride, vinyl acetate, etc. by the use of peroxide type of catalyst is an example of the free-radical mechanism. The polymerization of isobutylene, styrene, vinyl ethers and alpha-methyl styrene with boron trifluoride, stannic chloride or aluminum chloride are examples of the cationic chain mechanism.

Vinyl compounds have also been polymerized in the presence of sodium and organoalkalies. For example, sodium malonic ester has been employed in the polymerization of styrene [Hermann and Vorlander, Chem. Zent. 70, I, page 730 (1899)], while ethyl magnesium bromide, sodium and sodium ethoxide have been employed in the polymerization of allyl cyanide [Bruylants et al., Bull. Soc. Chim., Belg., 32, page 317 (1923); ibid. 35, page 239 (1926)]. The above processes wherein sodium and organoalkalies are used give mainly dimers and trimers and in no case any high-molecular-weight polymers are obtained.

However, not all unsaturated organic compounds can be polymerized by the known polymerization catalysts. For example, acrylonitrile is not homopolymerized to a resinous polymer by ionic catalysts such as boron trifluoride or boron trifluoride etherate. Alpha-trifluoromethyl acrylonitrile also is not homopolymerized to a resinous polymer by boron trifluoride and is also resistant to polymerization by peroxide-type catalysts. Alpha-trifluoromethyl acrylamide also is not homopolymerizable to a resinous polymer by the conventional polymerization catalysts. In general, unsaturates which can be considered as having a low electron availability on the double bond are homopolymerizable to resinous polymers with difficulty or not at all by boron trifluoride and peroxide types of polymerization catalysts.

We have now found that ethylenically unsaturated compounds which contain two strongly electronegative groups attached to one of the double-bonded carbon atoms, and which compounds can be represented by the general formula:

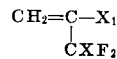

wherein X represents an atom of hydrogen and an atom of fluorine and $X_1$ represents the group —CN, the group

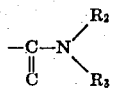

and the group

wherein $R_1$ represents an alkyl group containing from 1 to 4 carbon atoms (e. g. methyl, ethyl, propyl, butyl, etc.), an aryl group containing from 6 to 7 carbon atoms (e. g. phenyl, tolyl, etc.) or an aralkyl group containing from 7 to 8 carbon atoms (e. g. benzyl, phenylethyl, etc.), and wherein $R_2$ and $R_3$ each represents an atom of hydrogen, an alkyl group as defined above, an aryl group as defined above and an aralkyl group as defined above, can be readily polymerized to resinous polymers in the presence of an organic tertiary amine such as a trialkylamine containing from 3 to 12 carbon atoms, a nitrogen substituted tetraalkyl alkylene diamine wherein the alkylene group is saturated and contains from 2 to 4 carbon atoms and a nitrogen heterocyclic base containing from 4 to 9 carbon atoms in the ring and wherein the nitrogen in the ring is tertiary nitrogen. The organic tertiary amine polymerization catalysts above-mentioned do not require the added presence of either the boron trifluoride or the peroxide types of polymerization catalysts. It is remarkable that the organic tertiary amine catalysts of the invention will not initiate the homopolymerization to resinous polymers of unsaturates having but a single strongly electronegative group attached to one of the double-bonded carbon atoms such as, for example, acrylonitrile, acrylamide, alkyl acrylates, etc., which unsaturates are, however, homopolymerized by the conventional catalysts, but the tertiary amine catalysts do homopolymerize to resinous polymers unsaturates having two strongly electronegative groups attached to one of the double-bonded carbon atoms such as, for example, alpha-difluoromethyl acrylonitrile, alpha-trifluoromethyl acrylonitrile, alpha - difluoromethyl acrylamide, alpha-trifluoromethyl acrylamide and N-alkyl-alpha-difluoromethyl and N-alkyl alpha-trifluoromethyl acrylamides (e. g. N-methyl-alpha-difluoromethyl acrylamide, N-ethyl alpha-trifluoromethyl acrylamide, N,N-dimethyl alpha-trifluoromethyl acrylamide, etc.), which unsaturates are not homopolymerizable to resinous polymers by the conventional polymerization catalysts. The tertiary amine catalysts of the invention also homopolymerize to resinous polymers the alkyl esters of alpha-difluoromethyl and alpha-trifluoromethyl acrylic acids (e. g. methyl alpha-difluoromethyl acrylate, methyl alpha-trifluoromethyl acrylate, ethyl alpha-trifluoromethyl acrylate, etc.), wherein the alkyl group contains from 1 to 4 carbon atoms. The polymers resulting from the tertiary amine catalysts of the invention are for the most part clear, hard and moldable polymers which will not support combustion by themselves. The tertiary amine catalysts also readily initiate the copolymerization of the above-mentioned compounds wherein two electronegative groups are attached to one of the double-bonded carbon atoms with one another.

It is, accordingly, an object of the invention to provide a new and improved process for polymerizing to resinous polymers ethylenically unsaturated compounds having two strongly electronegative groups attached to one of the double-bonded carbon atoms. Another object is to provide a new process for copolymerizing to resinous copolymers such ethylenically unsaturated compounds. Still another object is to provide tertiary amine polymerization catalysts for initiating the polymerization to resinous polymers of such ethylenically unsaturated compounds. Other objects will become apparent hereinafter.

Specific examples of suitable tertiary amine polymerization catalysts of the invention are trialkylamines (e. g. trimethylamine, triethylamine, tri-n-propylamine, triisopropylamine, tri-n-butylamine, triisobutylamine, tri-sec. butylamine, tri-tert. butylamine, etc., mixed trialkylamines such as, for example, dimethyl ethylamine, diethyl methylamine, the dimethyl propylamines, the dimethyl butylamines, etc.), tetramethyl alkylene diamines (e. g. N,N,N',N'-tetramethyl ethylene diamine, N,N,N',N'-tetramethyl trimethylene diamine, etc.) and nitrogen heterocyclic compounds wherein the nitrogen in the ring is tertiary nitrogen (e. g. pyridine, picoline, N-β-methoxyethyl piperidine, quinoline, quinaldine, N-octyl tetrahydroquinoline, N,N'-dibutyl piperazine, morpholine, N-methyl morpholine, and similar tertiary amines).

In accordance with the practice of the invention, the polymerization to resinous polymers of the ethylenically unsaturated compounds having two strongly electronegative groups attached to one of the double-bonded carbon atoms, alone or conjointly with one another, in the presence of one or more of the tertiary amines abovementioned, can be effected in mass or in the presence of an inert diluent (e. g. water, acetone-water mixtures, alcohols of the series $C_nH_{2n+1}OH$ such as methanol, ethanol, etc., 1,4-dioxane, acetonitrile, isopropyl ether, etc.). However, the monomers can also be emulsified in a liquid in which they are insoluble and the emulsion then subjected to polymerization in the presence of one or more of the tertiary amine polymerization catalysts. Where the monomers are insoluble in water, they can be suspended therein using a relatively poor dispersing agent (e. g. starch) and polymerized in granular form, in the presence of one or more of the tertiary amine polymerization catalysts. The temperature of polymerization can advantageously be varied from −80° C. to 200° C., preferably from −50° C. to 100° C. Where the polymerization is carried out in an inert solvent such as those previously mentioned, the concentration of monomer or combined monomers can be varied widely, but for practical operation, the concentration of the monomers can be from 1 to 25 per cent by weight of the solvent employed. The amount of the tertiary amine polymerization catalysts can be varied from as low as 0.01% to about 25% of the total weight of monomers charged into the reaction vessel. However, it is possible to use several times this higher amount, so that the tertiary amine catalyst functions not only as a catalyst, but at the same time as the reaction medium. The resinous copolymers which can be prepared can contain variable amounts of two or more of the unsaturates having two strongly electronegative groups on one of the double-bonded carbon atoms, and are obtained by the processes described with organic tertiary amines as catalysts by employing starting polymerization mixtures of the monomers containing not less than one per cent of the minor monomeric constituent.

The following examples will serve further to illustrate the practice of the invention.

Example 1

0.1 gram of triethylamine was added to 5 grams of alpha-difluoromethyl acrylamide in 10 cc. of acetonitrile. After several hours standing at room temperature, ether was added to the mixture. There was obtained a resinous white precipitate of poly-alpha- difluoromethyl acrylamide, which was filtered off, washed and dried. The polymer did not support combustion.

Example 2

5 grams of alpha-trifluoromethyl acrylamide were polymerized in the presence of 0.1 gram of triethylamine and in a solvent of acetonitrile as described in Example 1. The poly-alpha-trifluoromethyl acrylamide was obtained in the form of a white resinous precipitate, which did not support combustion.

In place of the alpha-difluoromethyl acrylamide in the above example, there can be substituted an equivalent amount of N-methyl-alpha - difluoromethyl acrylamide, N - methyl-alpha-trifluoromethyl acrylamide, N,N-dimethyl alpha-difluoromethyl acrylamide, N,N-dimethyl alpha - trifluoromethyl acrylamide, N - phenyl alpha - trifluoromethyl acrylamide, N - benzyl alpha-trifluoromethyl acrylamide, etc., to obtain the corresponding resinous homopolymers. None of these polymers will support combustion.

Example 3

10 grams of alpha-trifluoromethyl acrylonitrile were cooled to a temperature of from −40° to −50° C. and then 0.1 gram of triethylamine was added. A rapid polymerization reaction began immediately. The mixture was then removed from the cooling bath and allowed to warm up to room temperature. After a few minutes, the polymerization was completed, and there was obtained a clear, hard and moldable polymer of alpha-difluoromethyl acrylonitrile. The polymer was soluble in acetone and would not support combustion by itself.

In place of the alpha-trifluoromethyl acrylonitrile, in the above example, there can be substituted an equivalent amount of alpha-difluoromethyl acrylonitrile to give the corresponding resinous polymer. In place of the triethylamine in the above example, there can be substituted an equivalent amount of another trialkylamine such as those previously mentioned as being suitable polymerization catalysts or an equivalent amount of N,N,N',N'-tetramethyl ethylene diamine.

*Example 4*

To 10 grams of alpha-trifluoromethyl acrylonitrile there was added 0.1 gram of quinoline and the mixture cooled to 0° C. Polymerization started immediately and within about 10 minutes, a clear, hard polymer of alpha-trifluoromethyl acrylonitrile was obtained. This polymer had about the same characteristics of solubility in acetonitrile and resistance to combustion as poly-alpha-trifluoromethyl acrylonitrile produced by the process of Example 3.

In place of the quinoline in the above example, there can be substituted an equivalent amount of other tertiary amines, for example, pyridine, picoline, quinaldine, morpholine, N-methyl morpholine, N,N'-dibutyl piperazine, N-octyl tetrahydroquinoline, and in place of the alpha-trifluoromethyl acrylonitrile in the above example, there can be substituted an equivalent amount of alpha-difluoromethyl acrylonitrile, to give similar resinous homopolymers.

*Example 5*

Several drops of quinoline were added to 5 grams of cooled to 0° C. methyl-alpha-trifluoromethyl acrylate. The polymerization reaction started immediately and was completed within a few mintes. There was obtained a clear, hard, moldable poly-methyl-alpha-trifluoromethyl acrylate. This polymer also did not support combustion.

In place of the methyl-alpha-trifluoromethyl acrylate in the above example, there can be substituted an equivalent amount of methyl alpha-difluoromethyl acrylate, ethyl alpha-trifluoromethyl acrylate, ethyl alpha-difluoromethyl acrylate, n-propyl alpha-trifluoromethyl acrylate, n-butyl alpha-trifluoro-methyl acrylate, etc., to give the corresponding resinous homopolymers. In place of the quinoline in the above example, there can be substituted an equivalent amount of pyridine, picoline, quinaldine, morpholine, N-methyl morpholine, N,N'-dibutyl piperazine, N-octyl tetrahydroquinoline or N-β-methoxyethyl piperidine to obtain similar resinous polymers.

*Example 6*

Several drops of trimethylamine were added to 5 grams of methyl alpha-difluoromethyl acrylate at room temperature. The polymerization reaction was exothermic and was completed within a period of 10 minutes. There was obtained a clear, hard polymer of methyl alpha-difluoromethyl acrylate, which was moldable, and which would not support combustion.

In place of the methyl alpha-difluoromethyl acrylate in the above example, there can be substituted an equivalent amount of other alkyl esters such as the ethyl, n-propyl, isopropyl, n-butyl, isobutyl, sec. butyl, or tert. butyl alpha-difluoromethyl acrylates, or an equivalent amount of the corresponding alkyl esters of alpha-trifluoromethyl acrylic acid. In place of the triethylamine in the above example, there can be substituted an equivalent amount of other trialkylamine polymerization catalysts selected from those mentioned previously as being suitable.

The monomeric alpha-difluoromethyl and alpha-trifluoromethyl acrylonitriles can be prepared as described in copending application Serial No. 94,742 (now United States Patent 2,541,466, dated February 13, 1951), filed of even date herewith, in the name of Joseph B. Dickey. The monomeric alpha-difluoromethyl and alpha-trifluoromethyl acrylamides can be prepared as described in copending application Serial No. 94,741 (now United States Patent 2,541,465, dated February 13, 1951), filed of even date herewith, in the name of Joseph B. Dickey. The monomeric alpha-difluoromethyl and alpha-trifluoromethyl alkyl acrylates can be prepared as described in copending application Serial No. 665,621, filed April 27, 1946, in the name of Joseph B. Dickey (now United States Patent 2,472,812, dated June 14, 1949).

We claim:

1. A process for preparing a resinous polymer of a monomeric, unsaturated compound selected from those consisting of compounds represented by the following general formulas:

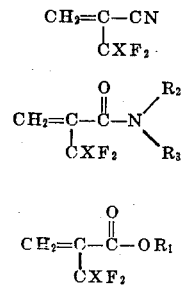

and wherein each X represents a member selected from the group consisting of an atom of hydrogen and an atom of fluorine, R₁ represents an alkyl group containing from 1 to 4 carbon atoms and R₂ and R₃ each represent a member selected from the group consisting of an atom of hydrogen, an alkyl group containing from 1 to 4 carbon atoms, a phenyl group and a benzyl group, comprising polymerizing the said monomer in the presence of from 0.01 to 25 per cent by weight of the monomer of an organic tertiary amine selected from the group consisting of a trialkylamine of from 3 to 12 carbon atoms, an N,N,N',N'-tetramethyl alkylene diamine wherein the alkylene group is saturated and contains from 2 to 4 carbon atoms and a nitrogen heterocyclic base containing from 4 to 9 carbon atoms in the ring and wherein the nitrogen in the ring is tertiary nitrogen, the said organic tertiary amine being the sole polymerization catalyst therein.

2. A process of preparing a resinous polymer of monomeric alpha-trifluoromethyl acrylamide comprising polymerizing the monomer in the presence of from 0.01 to 25 per cent by weight of the monomer of a trialkylamine of from 3 to 12 carbon atoms the said trialkylamine being the sole polymerization catalyst therein.

3. A process of preparing a resinous polymer of monomeric alpha-trifluoromethyl acrylamide comprising polymerizing the monomer in the presence of from 0.01 to 25 per cent by weight of the monomer of an N,N,N',N'-tetramethyl alkylene diamine wherein the alkylene group is saturated and contains from 2 to 4 carbon atoms the said diamine being the sole polymerization catalyst therein.

4. A process of preparing a resinous polymer of monomeric alpha-trifluoromethyl acrylamide comprising polymerizing the monomer in the presence of from 0.01 to 25 per cent by weight of the monomer of a nitrogen heterocyclic base containing from 4 to 9 carbon atoms in the ring and wherein the nitrogen in the ring is tertiary nitrogen the said base being the sole polymerization catalyst therein.

5. A process of preparing a resinous polymer of monomeric alpha-trifluoromethyl acrylamide comprising polymerizing the monomer in the presence of from 0.01 to 25 per cent by weight of the monomer of triethylamine the said triethylamine being the sole polymerization catalyst therein.

6. A process of preparing a resinous polymer of monomeric alpha-trifluoromethyl acrylamide comprising polymerizing the monomer in the presence of from 0.01 to 25 per cent by weight of the monomer of N,N,N',N'-tetramethyl ethylene diamine the said diamine being the sole polymerization catalyst therein.

7. A process of preparing a resinous polymer of monomeric alpha-trifluoromethyl acrylamide comprising polymerizing the monomer in the presence of from 0.01 to 25 per cent by weight of the monomer of quinoline the said quinoline being the sole polymerization catalyst therein.

JOSEPH B. DICKEY.
HARRY W. COOVER, Jr.

REFERENCES CITED

The following references are of record in the file of this patent:

UNITED STATES PATENTS

| Number | Name | Date |
| --- | --- | --- |
| 2,260,475 | Murke | Oct. 28, 1941 |
| 2,452,669 | Levine | Nov. 2, 1948 |
| 2,472,811 | Dickey | June 14, 1949 |

Certificate of Correction

Patent No. 2,559,855 — July 10, 1951

JOSEPH B. DICKEY ET AL.

It is hereby certified that error appears in the printed specification of the above numbered patent requiring correction as follows:

Column 2, lines 4 to 7, for

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*